US012658581B2

(12) United States Patent
Deng et al.

(10) Patent No.: US 12,658,581 B2
(45) Date of Patent: Jun. 16, 2026

(54) ANTENNA STRUCTURE

(71) Applicant: Quanta Computer Inc., Taoyuan City (TW)

(72) Inventors: Ying-Cong Deng, Taoyuan City (TW); Chung-Ting Hung, Taoyuan City (TW); Chin-Lung Tsai, Taoyuan City (TW); Chun-I Cheng, Taoyuan City (TW)

(73) Assignee: QUANTA COMPUTER INC., Taoyuan City (TW)

(*) Notice: Subject to any disclaimer, the term of this patent is extended or adjusted under 35 U.S.C. 154(b) by 40 days.

(21) Appl. No.: 18/928,543

(22) Filed: Oct. 28, 2024

(65) Prior Publication Data

US 2026/0066538 A1 Mar. 5, 2026

(30) Foreign Application Priority Data

Aug. 30, 2024 (TW) ................................ 113209411

(51) Int. Cl.
*H01Q 5/371* (2015.01)
*H01Q 1/48* (2006.01)
*H01Q 9/04* (2006.01)

(52) U.S. Cl.
CPC ............... *H01Q 5/371* (2015.01); *H01Q 1/48* (2013.01); *H01Q 9/0407* (2013.01)

(58) Field of Classification Search
CPC ............ H01Q 1/243; H01Q 1/38; H01Q 1/48; H01Q 1/521–523; H01Q 9/0407; H01Q 9/42; H01Q 5/30–50; H01Q 5/371; H01Q 5/378–392
See application file for complete search history.

(56) References Cited

U.S. PATENT DOCUMENTS 10,454,156 B1 * 10/2019 Yang ........................ H01Q 1/48
11,996,633 B2 * 5/2024 Cheng .................... H01Q 1/273
2023/0223710 A1 * 7/2023 Chen .................... H01Q 9/0414
343/702
2024/0195082 A1 * 6/2024 Lo .......................... H01Q 5/378

* cited by examiner

*Primary Examiner* — Hasan Islam
(74) *Attorney, Agent, or Firm* — McClure, Qualey & Rodack, LLP

(57) ABSTRACT

An antenna structure includes a feeding radiation element, a first radiation element, a second radiation element, a third radiation element, a fourth radiation element, a fifth radiation element, and a sixth radiation element. The first radiation element and the second radiation element are coupled to the feeding radiation element. The third radiation element is coupled to a ground voltage. The third radiation element is adjacent to the feeding radiation element. The fourth radiation element is coupled to the third radiation element. The fourth radiation element is adjacent to the first radiation element. The first radiation element is partially surrounded by the fourth radiation element. The fifth radiation element is coupled to the third radiation element. The fifth radiation element is adjacent to the second radiation element. The sixth radiation element is coupled to the ground voltage. The sixth radiation element is adjacent to the feeding radiation element.

9 Claims, 2 Drawing Sheets

ANTENNA STRUCTURE

CROSS REFERENCE TO RELATED APPLICATIONS

This application claims priority of Taiwan Patent Application No. 113209411 filed on Aug. 30, 2024, the entirety of which is incorporated by reference herein.

BACKGROUND OF THE INVENTION

Field of the Invention

The disclosure generally relates to an antenna structure, and more particularly, to a wideband antenna structure.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna for signal reception and transmission has an insufficient operational bandwidth, it may degrade the communication quality of the relative mobile device. Accordingly, it has become a critical challenge for designers to design a small-size, wideband antenna structure.

BRIEF SUMMARY OF THE INVENTION

In an exemplary embodiment, the invention is directed to an antenna structure that includes a feeding radiation element, a first radiation element, a second radiation element, a third radiation element, a fourth radiation element, a fifth radiation element, a sixth radiation element, and a carrier element. The feeding radiation element has a feeding point. The first radiation element is coupled to the feeding radiation element. The second radiation element is coupled to the feeding radiation element. The third radiation element is coupled to a ground voltage. The third radiation element is adjacent to the feeding radiation element. The fourth radiation element is coupled to the third radiation element. The fourth radiation element is adjacent to the first radiation element. The first radiation element is at least partially surrounded by the fourth radiation element. The fifth radiation element is coupled to the third radiation element. The fifth radiation element is adjacent to the second radiation element. The sixth radiation element is coupled to the ground voltage. The sixth radiation element is adjacent to the feeding radiation element. The feeding radiation element, the first radiation element, the second radiation element, the third radiation element, the fourth radiation element, the fifth radiation element, and the sixth radiation element are all disposed on the carrier element.

In some embodiments, the first radiation element includes a first segment, a second segment, a third segment, and a fourth segment. A first angle is formed between the first segment and the second segment. A second angle is formed between the second segment and the third segment. A third angle is formed between the third segment and the fourth segment.

In some embodiments, each of the first angle, the second angle, and the third angle is an obtuse angle.

In some embodiments, a first coupling gap is formed between the feeding radiation element and the third radiation element. A second coupling gap is formed between the first radiation element and the fourth radiation element. A third coupling gap is formed between the second radiation element and the fifth radiation element. A fourth coupling gap is formed between the feeding radiation element and the sixth radiation element. The width of each of the first coupling gap, the second coupling gap, the third coupling gap, and the fourth coupling gap is shorter than or equal to 2 mm.

In some embodiments, the antenna structure covers a first frequency band, a second frequency band, a third frequency band, and a fourth frequency band. The first frequency band is from 700 MHz to 960 MHz. The second frequency band is from 1710 MHz to 1900 MHz. The third frequency band is from 1900 MHz to 2170 MHz. The fourth frequency band is from 2400 MHz to 2700 MHz.

In some embodiments, the total length of the feeding radiation element and the first radiation element is substantially equal to 0.25 wavelength of the first frequency band.

In some embodiments, the total length of the feeding radiation element and the second radiation element is substantially equal to 0.25 wavelength of the third frequency band.

In some embodiments, the total length of the third radiation element and the fourth radiation element is substantially equal to 0.25 wavelength of the first frequency band.

In some embodiments, the total length of the third radiation element and the fifth radiation element is substantially equal to 0.25 wavelength of the second frequency band.

In some embodiments, the length of the sixth radiation element is substantially equal to 0.25 wavelength of the fourth frequency band.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
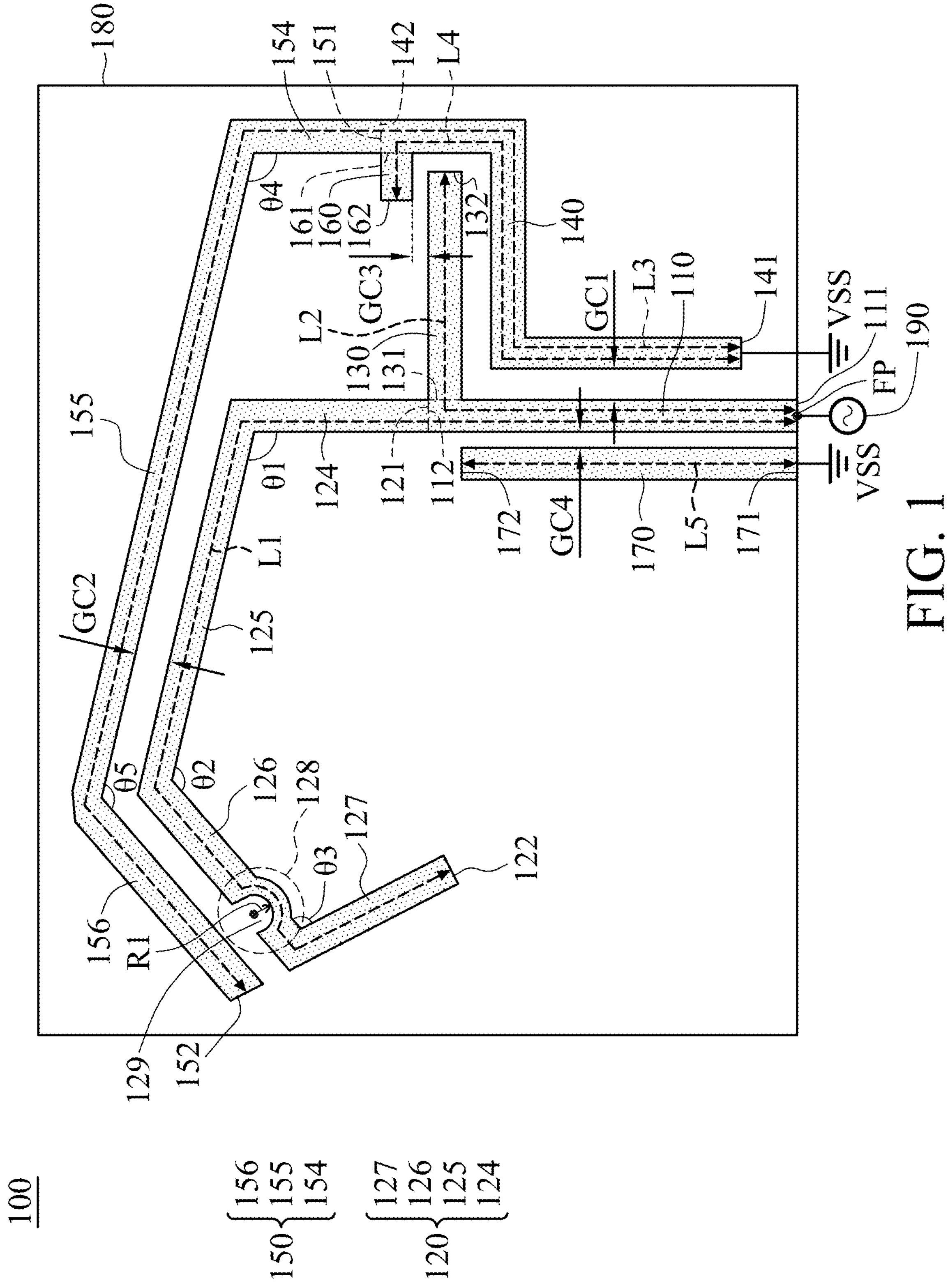
FIG. 1 is a diagram of an antenna structure according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of an antenna structure 100 according to an embodiment of the invention. The antenna structure 100 may be applied to a mobile device, such as a smart phone, a tablet computer, a notebook computer, a wireless access point, a router, or any device with a communication function. Alternatively, the antenna structure 100 may be applied to an electronic device, such as any unit of IOT (Internet of Things).

As shown in FIG. 1, the antenna structure 100 includes a feeding radiation element 110, a first radiation element 120, a second radiation element 130, a third radiation element 140, a fourth radiation element 150, a fifth radiation element 160, a sixth radiation element 170, and a carrier element 180. The feeding radiation element 110, the first radiation element 120, the second radiation element 130, the third radiation element 140, the fourth radiation element 150, the fifth radiation element 160, and the sixth radiation element 170 may all be made of metal materials, such as copper, silver, aluminum, iron, or their alloys.

The feeding radiation element 110 may substantially have a relatively long straight-line shape. Specifically, the feeding radiation element 110 has a first end 111 and a second end 112. A feeding point FP is substantially positioned at the first end 111 of the feeding radiation element 110. The feeding point FP may be further coupled to a signal source 190. For example, the signal source 190 may be an RF (Radio Frequency) module for exciting the antenna structure 100.

The first radiation element 120 may substantially have a meandering shape. Specifically, the first radiation element 120 has a first end 121 and a second end 122. The first end 121 of the first radiation element 120 is coupled to the second end 112 of the feeding radiation element 110. The second end 122 of the first radiation element 120 is an open end. In some embodiments, the first radiation element 120 includes a first segment 124, a second segment 125, a third segment 126, and a fourth segment 127. A first angle $\theta 1$ may be formed between the first segment 124 and the second segment 125. A second angle $\theta 2$ may be formed between the second segment 125 and the third segment 126. A third angle $\theta 3$ may be formed between the third segment 126 and the fourth segment 127. For example, each of the angles (the first angle $\theta 1$, the second angle $\theta 2$, and the third angle $\theta 3$) may be an obtuse angle, but they are not limited thereto. In some embodiments, the third segment 126 includes an arc concave portion 128 with a semicircular notch 129.

The second radiation element 130 may substantially have a relatively short straight-line shape, which may be substantially perpendicular to the feeding radiation element 110. Specifically, the second radiation element 130 has a first end 131 and a second end 132. The first end 131 of the second radiation element 130 is coupled to the second end 112 of the feeding radiation element 110. The second end 132 of the second radiation element 130 is an open end.

The third radiation element 140 may substantially have an N-shape or a Z-shape. Specifically, the third radiation element 140 has a first end 141 and a second end 142. The first end 141 of the third radiation element 140 is coupled to a ground voltage VSS. For example, the ground voltage VSS may be provided by a system ground plane (not shown). In some embodiments, the third radiation element 140 is adjacent to the feeding radiation element 110. A first coupling gap GC1 may be formed between the feeding radiation element 110 and the third radiation element 140. It should be noted that the term "adjacent" or "close" over the disclosure means that the distance (spacing) between two corresponding elements is smaller than a predetermined distance (e.g., 10 mm or the shorter), but often does not mean that the two corresponding elements directly touch each other (i.e., the aforementioned distance/spacing between them is reduced to 0).

The fourth radiation element 150 may substantially have another meandering shape. The first radiation element 120 is at least partially surrounded by the fourth radiation element 150. Specifically, the fourth radiation element 150 has a first end 151 and a second end 152. The first end 151 of the fourth radiation element 150 is coupled to the second end 142 of the third radiation element 140. The second end 152 of the fourth radiation element 150 is an open end. In some embodiments, the fourth radiation element 150 includes a fifth segment 154, a sixth segment 155, and a seventh segment 156. A fourth angle $\theta 4$ may be formed between the fifth segment 154 and the sixth segment 155. A fifth angle $\theta 5$ may be formed between the sixth segment 155 and the seventh segment 156. For example, the fourth angle $\theta 4$ may be substantially the same as the aforementioned first angle $\theta 1$, and the fifth angle $\theta 5$ may be substantially the same as the aforementioned second angle $\theta 2$, but they are not limited thereto. In some embodiments, the fourth radiation element 150 is adjacent to the first radiation element 120. A second coupling gap GC2 may be formed between the first radiation element 120 and the fourth radiation element 150.

The fifth radiation element 160 may substantially have a rectangular shape, which may be substantially perpendicular to the third radiation element 140 and the fourth radiation element 150. Specifically, the fifth radiation element 160 has a first end 161 and a second end 162. The first end 161 of the fifth radiation element 160 is coupled to the second end 142 of the third radiation element 140. The second end 162 of the fifth radiation element 160 is an open end. For example, the second end 132 of the second radiation element 130 and the second end 162 of the fifth radiation element 160 may substantially extend in opposite directions. In some embodiments, the fifth radiation element 160 is adjacent to the second radiation element 130. A third coupling gap GC3 may be formed between the second radiation element 130 and the fifth radiation element 160.

The sixth radiation element 170 may substantially have a straight-line shape, which may be substantially parallel to the feeding radiation element 110. Specifically, the sixth radiation element 170 has a first end 171 and a second end 172. The first end 171 of the sixth radiation element 170 is coupled to the ground voltage VSS. The second end 172 of the sixth radiation element 170 is an open end. In some embodiments, the sixth radiation element 170 is positioned at one side (e.g., the left side) of the feeding radiation element 110, and the third radiation element 140 is positioned at the opposite side (e.g., the right side) of the feeding radiation element 110. In other words, the feeding radiation element 110 may be disposed between the third radiation element 140 and the sixth radiation element 170. In some embodiments, the sixth radiation element 170 is adjacent to the feeding radiation element 110. A fourth coupling gap GC4 may be formed between the feeding radiation element 110 and the sixth radiation element 170.

The feeding radiation element 110, the first radiation element 120, the second radiation element 130, the third radiation element 140, the fourth radiation element 150, the fifth radiation element 160, and the sixth radiation element 170 may all be disposed on the same surface of the carrier element 180. The shape and type of the carrier element 180 are not limited in the invention. For example, the carrier element 180 may be an FR4 (Flame Retardant 4) substrate, a PCB (Printed Circuit Board), or an FPC (Flexible Printed Circuit). In some embodiments, the antenna structure 100 is a planar antenna structure.

Figure 2:
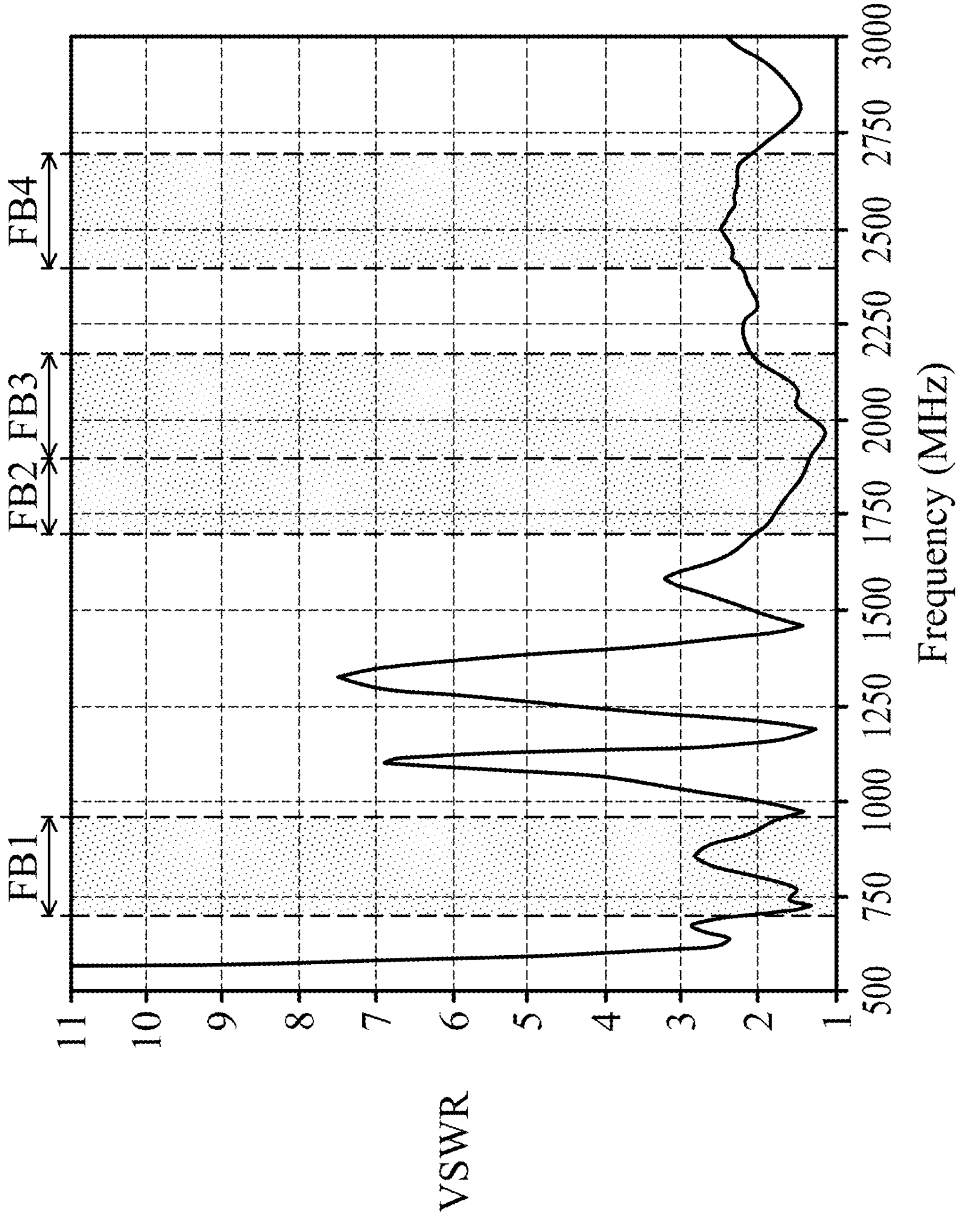
FIG. 2 is a diagram of VSWR (Voltage Standing Wave Ratio) of an antenna structure according to an embodiment of the invention.

FIG. 2 is a diagram of VSWR (Voltage Standing Wave Ratio) of the antenna structure 100 according to an embodiment of the invention. The horizontal axis represents the operational frequency (MHz), and the vertical axis represents the VSWR. According to the measurement of FIG. 2, the antenna structure 100 can cover a first frequency band FB1, a second frequency band FB2, a third frequency band FB3, and a fourth frequency band FB4. For example, the first frequency band FB1 may be from 700 MHz to 960 MHz, the second frequency band FB2 may be from 1710 MHz to 1900 MHz, the third frequency band FB3 may be from 1900 MHz to 2170 MHz, and the fourth frequency band FB4 may be from 2400 MHz to 2700 MHz. Therefore, the antenna structure 100 can support at least the wideband operations of LTE (Long Term Evolution).

In some embodiments, the operational principles of the antenna structure 100 will be described as follows. The feeding radiation element 110 and the first radiation element 120 are excited to generate the first frequency band FB1. The third radiation element 140 and the fourth radiation element 150 are excited by the feeding radiation element 110 and the first radiation element 120 using a coupling mechanism, so as to increase the bandwidth of the first frequency band FB1. The third radiation element 140 and the fifth radiation element 160 are excited to generate the second frequency band FB2. The feeding radiation element 110 and the second radiation element 130 are excited to generate the third frequency band FB3. In addition, the sixth radiation element 170 is excited to generate the fourth frequency band FB4.

In some embodiments, the element sizes of the antenna structure 100 will be described as follows. The total length L1 of the feeding radiation element 110 and the first radiation element 120 may be substantially equal to 0.25 wavelength (λ/4) of the first frequency band FB1 of the antenna structure 100. The total length L2 of the feeding radiation element 110 and the second radiation element 130 may be substantially equal to 0.25 wavelength (λ/4) of the third frequency band FB3 of the antenna structure 100. The total length L3 of the third radiation element 140 and the fourth radiation element 150 may be substantially equal to 0.25 wavelength (λ/4) of the first frequency band FB1 of the antenna structure 100. The total length L4 of the third radiation element 140 and the fifth radiation element 160 may be substantially equal to 0.25 wavelength (λ/4) of the second frequency band FB2 of the antenna structure 100. The length L5 of the sixth radiation element 170 may be substantially equal to 0.25 wavelength (λ/4) of the fourth frequency band FB4 of the antenna structure 100. The width of each of the coupling gaps (the first coupling gap GC1, the second coupling gap GC2, the third coupling gap GC3, and the fourth coupling gap GC4) may be shorter than or equal to 2 mm. Both the first angle θ1 and the fourth angle θ4 may be from 95 to 120 degrees. Both the second angle θ2 and the fifth angle θ5 may be from 110 to 150 degrees. The third angle θ3 may be from 95 to 130 degrees. The radius R1 of the semicircular notch 129 of the arc concave portion 128 of the third segment 126 may be from 0.5 mm to 1 mm. The above ranges of element sizes are calculated and obtained according to many experimental results, and they help to optimize the operational bandwidth and the impedance matching of the antenna structure 100.

The invention proposes a novel antenna structure. In comparison to the conventional design, the invention has at least the advantages of small size, wide bandwidth, and low manufacturing cost. Therefore, the invention is suitable for application in a variety of mobile communication devices or the IOT.

Note that the above element sizes, element shapes, and frequency ranges are not limitations of the invention. An antenna designer can fine-tune these settings or values to meet different requirements. It should be understood that the antenna structure of the invention is not limited to the configurations of FIGS. 1 and 2. The invention may merely include any one or more features of any one or more embodiments of FIGS. 1 and 2. In other words, not all of the features displayed in the figures should be implemented in the antenna structure of the invention.

Use of ordinal terms such as “first”, “second”, “third”, etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna structure, comprising:

a feeding radiation element, having a feeding point;

a first radiation element, coupled to the feeding radiation element;

a second radiation element, coupled to the feeding radiation element;

a third radiation element, coupled to a ground voltage, wherein the third radiation element is adjacent to the feeding radiation element;

a fourth radiation element, coupled to the third radiation element, wherein the fourth radiation element is adjacent to the first radiation element, and the first radiation element is at least partially surrounded by the fourth radiation element;

a fifth radiation element, coupled to the third radiation element, wherein the fifth radiation element is adjacent to the second radiation element;

a sixth radiation element, coupled to the ground voltage, wherein the sixth radiation element is adjacent to the feeding radiation element; and a carrier element, wherein the feeding radiation element, the first radiation element, the second radiation element, the third radiation element, the fourth radiation element, the fifth radiation element, and the sixth radiation element are disposed on the carrier element;

wherein the antenna structure covers a first frequency band, a second frequency band, a third frequency band, and a fourth frequency band;

wherein a total length of the feeding radiation element and the second radiation element is substantially equal to 0.25 wavelength of the third frequency band.

2. The antenna structure as claimed in claim 1, wherein the first radiation element comprises a first segment, a second segment, a third segment and a fourth segment, a first angle is formed between the first segment and the second segment, a second angle is formed between the second segment and the third segment, and a third angle is formed between the third segment and the fourth segment.

3. The antenna structure as claimed in claim 2, wherein each of the first angle, the second angle, and the third angle is an obtuse angle.

4. The antenna structure as claimed in claim 1, wherein a first coupling gap is formed between the feeding radiation element and the third radiation element, a second coupling gap is formed between the first radiation element and the fourth radiation element, a third coupling gap is formed between the second radiation element and the fifth radiation element, a fourth coupling gap is formed between the feeding radiation element and the sixth radiation element, and a width of each of the first coupling gap, the second coupling gap, the third coupling gap and the fourth coupling gap is shorter than or equal to 2 mm.

5. The antenna structure as claimed in claim 1, wherein the first frequency band is from 700 MHz to 960 MHz, the second frequency band is from 1710 MHz to 1900 MHz, the third frequency band is from 1900 MHz to 2170 MHz, and the fourth frequency band is from 2400 MHz to 2700 MHz.

6. The antenna structure as claimed in claim 5, wherein a total length of the feeding radiation element and the first radiation element is substantially equal to 0.25 wavelength of the first frequency band.

7. The antenna structure as claimed in claim 5, wherein a total length of the third radiation element and the fourth radiation element is substantially equal to 0.25 wavelength of the first frequency band.

8. The antenna structure as claimed in claim 5, wherein a total length of the third radiation element and the fifth radiation element is substantially equal to 0.25 wavelength of the second frequency band.

9. The antenna structure as claimed in claim 5, wherein a length of the sixth radiation element is substantially equal to 0.25 wavelength of the fourth frequency band.

* * * * *